Patented May 8, 1923.

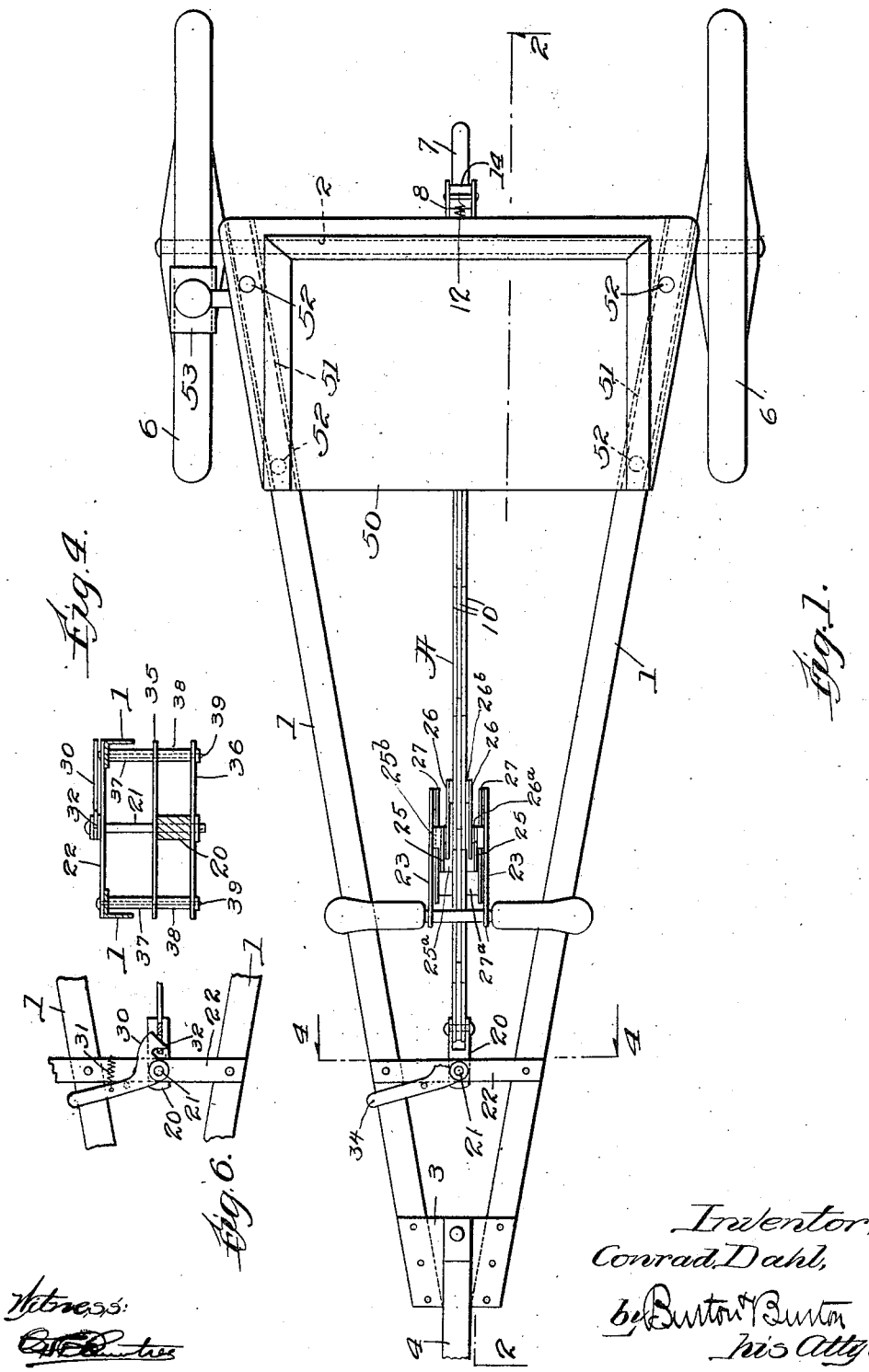

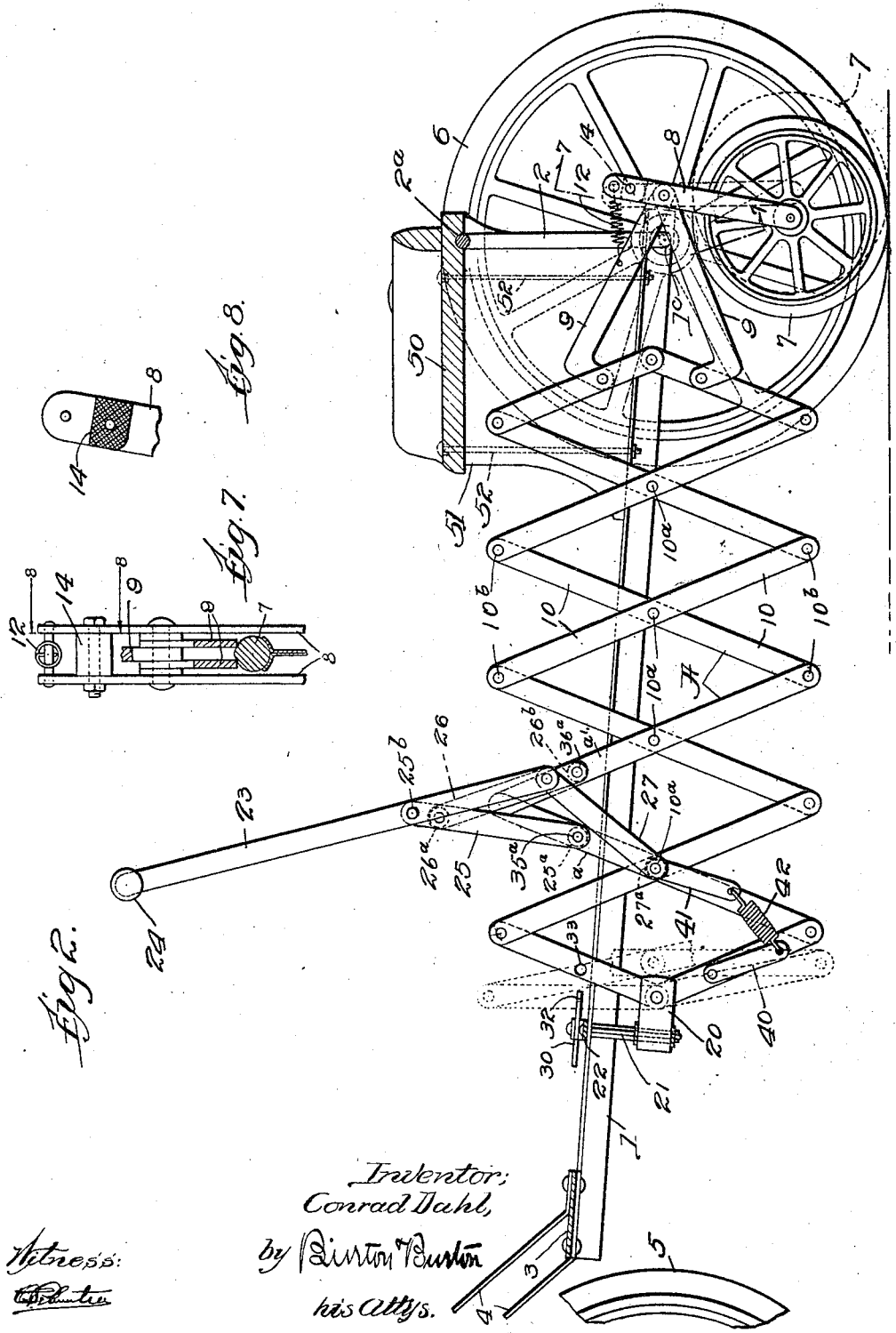

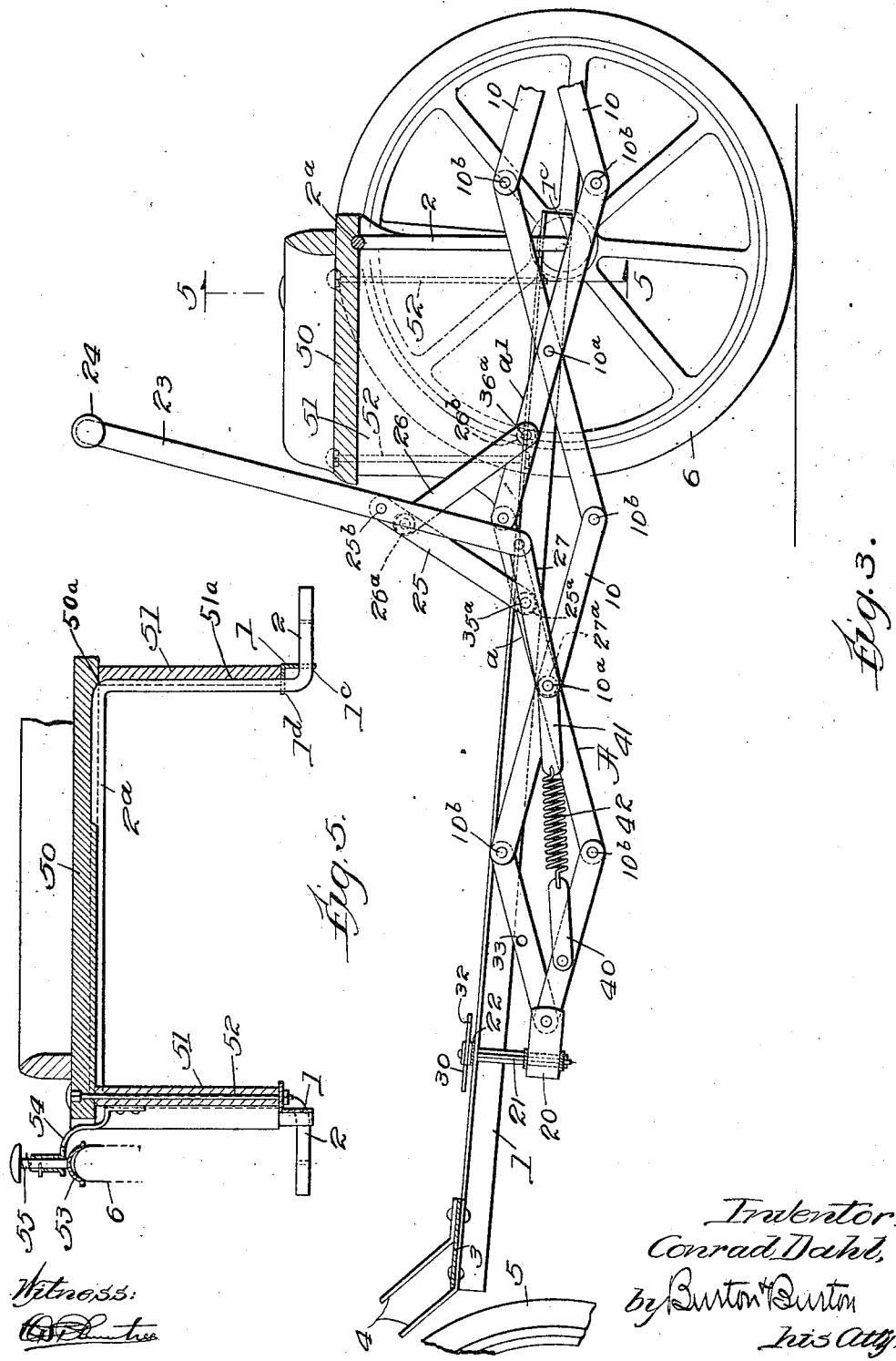

1,454,626

UNITED STATES PATENT OFFICE.

CONRAD DAHL, OF CHICAGO, ILLINOIS, ASSIGNOR TO DONALD M. CARTER, TRUSTEE, OF CHICAGO, ILLINOIS.

OCCUPANT-PROPELLED VEHICLE.

Application filed November 25, 1921. Serial No. 517,442.

*To all whom it may concern:*

Be it known that I, CONRAD DAHL, a citizen of the United States, residing at Chicago, in the county of Cook and State of Illinois, have invented certain new and useful Improvements in Occupant-Propelled Vehicles, of which the following is a specification, reference being had to the accompanying drawings, forming a part thereof.

The purpose of this invention is to provide an improved construction of an occupant-propelled vehicle of the type in which a ground-engaging propeller is operated for propelling thrust by means of a lazy-tongs which is extended for its propelling thrust by means of a manually-operated lever. It consists in the elements and features of construction shown and described, as indicated in the claims.

In the drawings:—

Figure 1 is a plan view of a vehicle embodying this invention, the forward portion comprising the steering wheel being broken away.

Figure 2 is a section at the line, 2—2, on Figure 1, showing the propelling means in side elevation, the lazy-tongs being partly extended.

Figure 3 is a view similar to Figure 2, showing the lazy-tongs propelling structure substantially fully extended.

Figure 4 is a section at the line, 4—4, on Figure 1.

Figure 5 is a section at the line, 5—5, on Figure 3.

Figure 6 is a detail plan view of the parts shown in Figure 4

Figure 7 is a rear elevation of the propeller fork and its connections.

Figure 8 is a section at the line, 8—8, on Figure 7.

The vehicle shown in the drawings comprises a frame structure consisting of two side bars, 1, 1, joined at their rear ends by the rear axle, 2, and converging forwardly to a junction plate, 3, by which they are secured together at their forward ends, and from which a truss, indicated in the drawings by the rear end portions of the upper and lower bars, 4, 4, extends obliquely up forward above the steering wheel, 5, to a steering head or pivot bearing (not shown) for the steering wheel fork or frame (not shown), the construction for steering being shown in my co-pending application filed simultaneously herewith, Serial No. 517,443.

The rear wheels, 6, 6, are freely journaled on the fixed axle, 2, outside the side bars, 1, 1, of the vehicle frame. The ground-engaging propeller, as illustrated, is a relatively small wheel, 7, carried in a fork, 8, which in turn is carried at the rear end of a lazy-tongs structure, A, consisting of two sets of parallel members, 10, 10, pivotally connected at the intersection of the members of one set with the respective members of the other set by pivotal bolts, 10ª, herein called the intersectional pivots of the lazy-tongs, and having the respective pairs of intersecting members pivotally connected at their respectively adjacent ends by pivot bolts, 10ᵇ, herein for convenience of identification called the lateral lazy-tong pivots. The first and last pairs of lazy-tong members terminate at their intersections, being half-length, said half-length members being for distinction, hereinafter referred to as the terminal links of the lazy-tongs; and the pivots at these points are referred to as terminal pivots of the lazy-tongs.

The attachment of the propeller fork, 8, to the lazy-tongs is effected by two similar link members, 9, 9, pivotally attached at their forward ends respectively to the two links of the rear pair of the lazy-tongs at equal distances from the rear terminal pivot of the lazy-tongs, both of the links, 9, 9, being pivotally attached at their rear ends to each other and to the propeller fork at a short distance above the propeller wheel, 7, and the upper end of the fork is connected by a contractile spring, 12, extending therefrom to the upper one of the two links, 9, 9, said spring tending to retract the upper end of the fork and tilt the fork to its trailing position in the retraction or collapse of the lazy-tongs as shown in the dotted line in Figure 2. A stop block, 14, is mounted between the two bars of the propelled fork above the connection of the links, 9, 9, thereto, and below the attachment of the spring, 12, said block being serrated at its ends around the hole for the bolt by which it is clamped between the fork bars, said bars being also serrated around the bolt holes so that the block may be securely held as adjusted about the bolt; and the forward lower end of the block which stops against the upper edge of the link, 9, is eccentric with respect to the bolt, thereby varying according to its adjustment about the bolt, the point at which the stoppage occurs and the angle in which the fork is stopped in the tilting to trailing position.

The lazy-tongs, A, is connected at its forward terminal pivot to a clasp, 20, which is rigidly suspended by a bolt, 21, below the frame bars, 1, 1, being carried by a tie plate, 22, which extends across the bars above the same.

For operating the lazy-tongs, the operating lever comprising parallel bars, 23, 23, at opposite sides of the vertical plane and path of the lazy-tongs, and having at their upper ends the handle bar, 24, is mounted by means of similar linkage at said opposite sides of the lazy-tongs. The description of this linkage at one side will suffice for both, the construction being identical on the two sides.

Two links, 25 and 26, diverge from pivotal connection with each other and with the operating lever at a distance above the lower end of the latter to pivotal connections at $35^a$ and $36^a$, respectively, with two consecutive links of the lazy-tongs, which for convenience of future reference are indicated as $a$ and $a^1$. The lower end of the operating lever is connected by a link, 27, with the intersectional pivot of the forward one, $a$, of the two lazy-tongs links, $a$, $a^1$. Preferably, and as shown, the rear link, 26, though pivotally connected, as stated, with the operating lever, is not pivoted directly to that lever, but is pivoted to the forward link, 27, at a short distance from the pivot, $25^b$, of the latter to the operating lever, 23, for the purpose and with the effect of giving the operating lever a greater throw for a given fore-and-aft extension of the lazy-tongs, and also advances the entire range of the operating lever and so causes its rear position to be less inclined rearward. In order to connect the several links and levers as described, and to adapt the connected structure for swinging of the lever, 23, throughout the range necessary for extending and collapsing the lazy-tongs, said lever bars, 23, 23, are positioned outside all the links; the links, 27, are next inside the lever bars, 23, and at their lower ends are spaced off from the lazy-tongs member at their intersectional pivots by spacing sleeves, $27^a$, on said intersectional pivot bolts; the links, 25, are next inside the links, 27, and spaced off from the forward one, $a$, of the two lazy-tongs links, $a$, $a^1$, at their connection therewith by spacers, $25^a$, $25^a$; the links, 26, are next inside of the links, 25, and spaced off from the link, 25, by spacers, $26^a$, $26^a$, and from the lazy-tongs member, $a^1$, by spacers, $26^b$, $26^b$. This arrangement of the parts permits the different pivots to pass each other, as may be necessary in the operation for extending and collapsing the lazy-tongs.

The prime reason for making the lazy-tongs spreading means as described,—that is, consisting of the upwardly converging and pivotally connected links, 25 and 26, pivoted respectively to the consecutive lazy-tongs links which are to be spread for extending the lazy-tongs, is that a given angle of spread or divergence of these two links, 25 and 26, by reason of the links being connected to the lazy-tongs links at a distance from the intersectional pivots of the lazy-tongs, and extended to their own pivotal junction at a distance greater than the distance from their pivotal connections with the lazy-tongs links respectively, to the junction of said lazy-tongs links, a given angular spread of said links, 25 and 26, produces a greater angular spread of the lazy-tongs links; and thus, at the maximum extension of the lazy-tongs, as seen in Figure 3, while the lazy-tongs angle is nearly 180 degrees,— that is, the lazy-tongs construction is nearly "flat,"—the links, 25 and 26, are still at an acute angle, or at least at a relatively small angle effective and necessary for giving the down-pressure for the grip of the propeller on the ground; whereas, at the wide angle which the lazy-tongs links have at this position, direct extensional or spreading action of them would be accompanied with negligible down-pressure. By the construction shown there is afforded effective propelling grip to the furthermost limit of extension of the lazy-tongs.

When the lazy-tongs is to be collapsed and secured in order that the entire structure may be handled bodily for carrying it from place to place, the lazy-tongs is locked in collapsed position by a latch hook, 30, which is pivotally mounted upon the bolt, 21, and is held by a contractile spring, 31, in position for the engagement of its catch-nose, 32, with an eye or aperture, 33, formed in the upper forward link member of the lazy-tongs. The latch is extended beyond the spring connection in a handle, 34, by which it may be readily engaged by the operator's foot to disengage the hook, 32, from the lazy-tongs to permit the extension of the latter.

In order that the bolt, 21, by which the lazy-tongs-holding clasp is suspended, may be suitably rigid in its position for holding the lazy-tongs, it is not only mounted in the tie plate, 22, but also extends through and is positioned by two additional transversely extending bars, 35 and 36, which are spaced below the bar, 22, by spacing sleeves, 37, 37 and 38, 38, on vertically extending bolts, 39, through all said transverse bars and the horizontal flanges of the frame bars, 1, 1, serving to bind the structure together, the clasp, 20, being mounted on the bolt between the bars, 35 and 36, and thereby positioned suitably below the level of the frame bars, 1, 1.

It is desirable that an initial collapsing impulse should be given to the lazy-tongs when it has been extended to the limit in its propelling thrust. A contractile spring connecting two consecutive intersectional pivots or consecutive links will accomplish this, but unless special provision to the contrary is made, such a spring causes embarrassment at the limit of collapse when the two pivots which it connects are very much closer together than the minimum length of the completely contracted spring. This embarrassment is avoided in the construction illustrated by providing a foldable three-part linkage consisting of two links, 40 and 41, connected respectively to two consecutive link members of the lazy-tongs, the third intermediate link being a contractile spring, 42, connected to the proximate ends of the links, 40 and 41. This foldable linkage is accommodated at collapsed position of the lazy-tongs, as may be understood from Figure 2 while at extended position the three link members are aligned and the spring member is extended ready to contract for the desired initial collapsing impulse of the lazy-tongs.

Certain details appearing in the drawings may require description. The rear axle is mounted fixedly on the wheel spindles penetrating the vertical flanges of the frame side bars, 1, 1, as seen at 1$^c$ on Fig. 5, and being bowed up between said side bars to leave a clear path for the propeller. The seat, 50, is mounted above the uplifted part, 2$^a$, of the axle bow, on two side cheeks, 51, 51 which are mounted on the side bars, 1, 1, and secured,—with the seat, 50, to the side bars by tie bolts, 52, 52. Preferably, as shown, the axle bow is positioned inside the seat structure,—that is, between the cheeks, 51, 51, and it is rendered secure in its position as against liability to swing down, by being let into grooves, 51$^a$ and 50$^a$, on the cheeks and seat board respectively, and into notches in the horizontal flanges of the side bars, 1, 1, as seen at 1$^c$, on Figure 5.

A hand operated brake shoe, 53, is desirably provided mounted as seen in Figure 5 on the right hand side cheek, 51, by means of a bracket, 54, in which said brake is upheld by a spring, 55, ready to be pressed down onto the wheel. Preferably the brake shoe, 53, is formed as a fork striding the wheel tire and contacting it at the sides only rather than at the thread, as may be understood from Figure 5.

I claim:—

1. In an occupant-propelled vehicle, in combination with a frame and supporting wheels, a ground-engaging member; a lazy-tongs structure by which said ground-engaging member is carried for rearward thrust in the propelling stroke; an operating handle-lever member for extending the lazy-tongs; divergent links by which said handle-lever member is supported on two consecutive lazy-tong members, and a link connecting the lower end of the handle-lever member with an intersectional pivot of the lazy-tongs.

2. In the construction defined in claim 1, foregoing, one of said handle-lever supporting links being pivoted to the handle-lever member, and the other being pivoted to the first mentioned link at a short distance from the pivot of said first link to the handle member, for increasing the throw of the lever handle member.

3. In an occupant-propelled vehicle comprising a frame and supporting wheels therefor, and having a ground-engaging member for propulsion, a lazy-tongs structure by which said ground engaging member is carried for its propelling stroke, a foldable linkage connecting one of the intersecting pivots of the lazy tongs with an antecedent lazy-tongs member, one member of said linkage being a contractile spring, whereby the linkage unfolds to permit the extension of the lazy-tongs without resistance from the linkage to a predetermining extent, and tends to retract the lazy-tongs after further extension.

4. In an occupant-propelled vehicle, in which the propelling means comprises a ground-engaging member and a lazy-tongs for thrusting and retracting said ground-engaging member, means for carrying the ground-engaging member from the rear end of the lazy-tongs, a carrier for the ground-engaging member, a pair of links pivotally connecting the rearmost pair of lazy-tong members to said carrier, a spring reacting between said carrier and one of said links for thrusting the carrier rearward at its lower end, and a stop for limiting said rearward thrust, said stop being adjustably secured on said carrier for varying the position at which the carrier is stopped in said thrust.

5. In the construction defined in claim 4, foregoing, the carrier for the ground-engaging member comprising two fork-arms which are clamped together, the stop comprising a block which is clamped between said fork arms and adapted to be turned on the clamping bolt and having an edge eccentric to the clamping bolt and which encounters one of the links for stopping the rearward swing of the carrier; whereby adjusting said block about the clamping bolt varies the position at which the rearward swing of the carrier is arrested.

6. In an occupant-propelled vehicle in combination with a frame and supporting wheels therefor, a ground engaging member, a lazy tongs structure by which said ground engaging member is carried for rearward thrust in the propelling stroke, said lazy-tongs being mounted at the forward end on the frame, and at the rear end on the ground-engaging member, at substantially equal heights from the ground, so as to have its intersectional pivots substantially in a horizonal line at all degrees of extension of the lazy-tongs, an operating handle lever member and connections therefrom for extending the lazy tongs adapted to convert rearwardly applied pressure on the handle lever into downward pressure on the lazy tongs for holding the ground engaging member on the ground during the rear thrust.

In testimony whereof, I have hereunto set my hand at Chicago, Illinois, this 26th day of October, 1921.

CONRAD DAHL.